(12) United States Patent
Vehmas et al.

(10) Patent No.: US 11,852,413 B2
(45) Date of Patent: Dec. 26, 2023

(54) TEMPERING FURNACE FOR GLASS SHEETS

(71) Applicant: Glaston Finland Oy, Tampere (FI)

(72) Inventors: Jukka Vehmas, Tampere (FI); Kyösti Keto, Tampere (FI)

(73) Assignee: GLASTON FINLAND OY, Tampere (FI)

( * ) Notice: Subject to any disclaimer, the term of this patent is extended or adjusted under 35 U.S.C. 154(b) by 0 days.

(21) Appl. No.: 17/435,171

(22) PCT Filed: Mar. 18, 2020

(86) PCT No.: PCT/FI2020/050168
§ 371 (c)(1),
(2) Date: Aug. 31, 2021

(87) PCT Pub. No.: WO2020/188147
PCT Pub. Date: Sep. 24, 2020

(65) Prior Publication Data
US 2022/0146201 A1    May 12, 2022

(30) Foreign Application Priority Data
Mar. 21, 2019 (FI) ...................... 20195208

(51) Int. Cl.
*F27B 9/10* (2006.01)
*C03B 27/04* (2006.01)
(Continued)

(52) U.S. Cl.
CPC ............ *F27B 9/10* (2013.01); *C03B 27/0404* (2013.01); *C03B 27/044* (2013.01); *F27B 9/062* (2013.01);
(Continued)

(58) Field of Classification Search
None
See application file for complete search history.

(56) References Cited

U.S. PATENT DOCUMENTS

| 4,314,836 A | 2/1982 | Seymour |
| 4,534,780 A | 8/1985 | Cemin |
| (Continued) | | |

FOREIGN PATENT DOCUMENTS

| CN | 101848875 A | 9/2010 |
| CN | 102190433 A | 9/2011 |
| (Continued) | | |

OTHER PUBLICATIONS

Brooklyn Fan (Year: 2018).*
(Continued)

*Primary Examiner* — Steven S Anderson, II
*Assistant Examiner* — Kurt J Wolford
(74) *Attorney, Agent, or Firm* — Boone IP Law, PLLC (57) ABSTRACT

The present disclosure relates to a tempering furnace for a glass sheet, which has a conveyor for the glass sheet, first convection blow means over the conveyor to heat the glass sheet by hot air jets blown on its top and/or bottom surface, and second convection blow means to help lead pressurized air from outside the tempering furnace to second blow nozzles from which air is discharged as jets towards the top and/or bottom surface of the glass sheet. The heating effect of the air jets on the glass sheet is adjustable by adjusting the feeding of electric current to electric elements inside blowing channels. Blow nozzles of the second convection blow means form blow zones. The heating effect on the glass sheet of the jets discharged from the second blow nozzles inside the blow zones is adjustable by adjusting the blowing pressure of feed pipes.

13 Claims, 4 Drawing Sheets

(51) Int. Cl.
 *C03B 27/044* (2006.01)
 *F27B 9/06* (2006.01)
 *F27B 9/30* (2006.01)
 *F27D 19/00* (2006.01)

(52) U.S. Cl.
 CPC ............ *F27B 9/3005* (2013.01); *F27D 19/00* (2013.01); *F27D 2019/0003* (2013.01); *F27M 2001/07* (2013.01)

(56) References Cited

U.S. PATENT DOCUMENTS

| | | | |
|---|---|---|---|
| 5,951,734 A * | 9/1999 | Friedel | .................... C03B 29/08 65/273 |
| 6,363,752 B1 | 4/2002 | Becker | |
| 6,470,711 B1 | 10/2002 | Jarvinen et al. | |
| 6,845,633 B2 | 1/2005 | Vitkala | |
| 8,322,162 B2 | 12/2012 | Janhunen et al. | |
| 2003/0061834 A1* | 4/2003 | Vitkala | .................. C03B 29/08 65/273 |
| 2010/0251773 A1 | 10/2010 | Vehmas | |
| 2011/0219822 A1* | 9/2011 | Anttonen | ................ C03B 29/08 65/355 |
| 2013/0291600 A1 | 11/2013 | Vehmas | |
| 2014/0345330 A1 | 11/2014 | Lammi et al. | |
| 2015/0007613 A1 | 1/2015 | Lammi et al. | |

FOREIGN PATENT DOCUMENTS

| | | | | |
|---|---|---|---|---|
| EP | 1241143 A2 * | 9/2002 | ............. | C03B 29/08 |
| EP | 1491509 A1 * | 12/2004 | ........... | C03B 27/012 |
| EP | 2368855 A2 | 9/2011 | | |
| EP | 2805926 A1 | 11/2014 | | |
| FI | 20020486 A | 9/2002 | | |
| FI | 120036 B | 6/2009 | | |
| FI | 120734 B | 2/2010 | | |
| FI | 20120163 A | 11/2013 | | |
| WO | WO-2009060120 A1 * | 5/2009 | ......... | C03B 27/0417 |

OTHER PUBLICATIONS

Elliptical orifice Flat Fan Nozzles for Lubrication (Year: 2018).*
Finnish Search Report issued in corresponding Finnish Patent Application No. 20195208 dated Sep. 13, 2019. (2 pages).
International Search Report (PCT/ISA/210) and Written Opinion (PCT/ISA/237) dated Jun. 12, 2020, by the Finnish Patent and Registration Office as the International Searching Authority for International Application No. PCT/FI2020/050168. (13 pages).
The extended European Search Report dated Sep. 1, 2022, by the European Patent Office in corresponding European Patent Application No. 20773742.0-1105. (8 pages).
The First Office Action dated Nov. 22, 2022, by the Intellectual Property Office of the People's Republic of China in corresponding Chinese Patent Application No. 2020800232905 and an English translation of the Action. (16 pages).

* cited by examiner

TEMPERING FURNACE FOR GLASS SHEETS

CROSS-REFERENCE TO RELATED APPLICATIONS

This application is the United States national phase under 35 U.S.C. § 371 of PCT International Patent Application No. PCT/FI2020/050168, filed on Mar. 18, 2020, which claims the benefit of Finnish Patent Application No. 20195208, filed on Mar. 21, 2019, the disclosures of which are hereby incorporated by reference herein in their entireties.

FIELD

The present disclosure relates to a furnace for heating glass sheets to temper them.

It is an object of the present disclosure to substantially improve the quality of tempered glass sheets and the capability of tempering furnaces in even heating of ever more difficult glass sheets.

BACKGROUND

Tempering or heating furnaces for glass sheets, in which glass sheets move in one direction or back and forth on rotating ceramic rollers, and from which they, at a tempering temperature, move successively, side by side, or as mixed glass loadings along a roller track to a tempering cooling unit at the back of the furnace, are commonly known and used. A furnace provided with a roller track is known in the field as a roller furnace, for example. In furnaces based on glass flotation technology, a glass sheet floats supported by a thin airbed, and touches the rollers of a conveyor track or other conveying members by one of its side edges, only. In a tempering furnace, glass sheets are heated from a factory temperature to the tempering temperature of 610 to 680° C., depending on the thickness of the glass. The temperature in a furnace is typically 700° C. The heating of a glass sheet typically takes 40 s per one mm of glass thickness, that is, 160 seconds for the glass thickness of 4 mm, for example. The thickness of glass sheets to be tempered is usually 1 to 25 mm.

In a tempering furnace, heat is transferred to the glass by radiating from the inner surfaces of the furnace, by convection from air, and by direct conduction from the contact points of the conveyor and glass sheet. In convection (or to be more precise, forced convection), air streams are directed to the surfaces of the glass sheet by means of flow machines.

Circulated air convection refers to an air blow towards a glass sheet, brought about by circulating air in the furnace by means of blowers. In pressurized air convection, the blowing of air towards a glass is carried out by leading pressurised air into the furnace from outside the furnace. In circulated air convection, the blowing pressure is typically from 100 to 2000 Pa, and in pressurised air convection from 0.1 to 5 bar depending on the model of the furnace and the adjustment value of convection. The blowing pressure in circulated air convection is adjusted by a frequency converter by changing the rotation speed of a bladed wheel. The blowing pressure of pressurised air convection is adjusted by a choke valve. The diameters and quantities of blow openings in pressurised air convection are notably smaller than in circulated air convection. The problems with pressurised air convection in relation to circulated air convection are energy losses and inefficiency at the final stage of heating, in particular, because the air in the furnace cools down. The biggest problem is insufficient convection capability due to which even heating of the top and bottom surfaces of the newest glass sheets, coated to increasingly reflect thermal radiation, is unsuccessful or requires an excessively long heating time. The advantages of pressurised air convection in relation to circulated air convection include very quick adjustability and the lower price of the equipment.

For the quality of tempered glass sheets, it is important that the glass sheets warm up evenly in the furnace. When being heated, the surfaces of the glass sheets warm up faster than the centre thickness, thereby forming a temperature profile in the thickness direction in the glass sheet. The temperature profile should be symmetric enough, in other words, the top and bottom surface should warm up at approximately the same rate. A difference in the heating rate of the top and bottom surface results in momentary bending of the glass sheet during heating due to the difference in the thermal expansion of the surface layers. The bending in question causes quality problems, such as white haze. Uncoated or so-called clear glass rather efficiently absorbs thermal radiation from a furnace. What is particularly challenging is to heat glass which has one surface, usually the top surface, coated with coatings that particularly efficiently reflect thermal radiation. Such selective and low emissivity coatings are in common use in windows, for example, to lower the energy consumption of buildings. When taking into consideration the practical quality and capacity requirements, the heating of a low emissivity, coated glass sheet is impossible without convection by means of which the radiation heating difference between a clear and coated glass sheet is compensated. Convection is also an excellent help in heating clear glass sheets.

In the tempering furnace of the reference publication EP2368855A2, air circulated in the furnace by a blower flows past an electric element in a nozzle enclosure and warms up before discharging as a jet from blow openings towards the glass. The heating effect of the air jets depends on the temperature of the jets, which depends on the electric current fed to the element. The electric element in the nozzle enclosure radiates heat to a nozzle deck which radiates heat to a glass sheet. This means that the radiation heating of the furnace is adjustable by the same electric element.

In the tempering furnace of the reference publication FI120734B, a glass sheet is heated by upper and lower convection blast and by upper and lower radiation heating. The tempering furnace has a plurality of nozzle pipes successively and in parallel. With the nozzle pipes, air pressurised outside the furnace by a compressor is blown as blasts on the surface of a glass sheet, and the blowing pressure of each nozzle pipe may be adjusted nozzle pipe specifically by valves outside the furnace. Adjusting is based on information on the shape of the load of glass sheets, which is obtained by the computer vision solution described in the reference publication. The convection blowing matrix described in the reference publication consists of 16 separate areas of adjustment whose blowing pressures may be adjusted by transverse and longitudinal adjustment valves.

In the tempering furnace of the reference publication FI120036B, the surface of the same glass is blasted by both circulated air and pressurised air convection. The circulated air convection device consists of successive transverse blow pipes on the entire width of the furnace, and the pressurised air convection device of successive 1 to 2 metre long blow pipes, adjustable separately, which there is a plurality of in the width direction of the furnace.

The side and end edges of a glass sheet have a tendency of heating up slightly faster and more than the centre area of the glass sheet in a tempering furnace, because the furnace surfaces radiating on them are subjected to a load and thus cool down less during a heating cycle. At times, the surfaces of glass sheets to be tempered are only partly painted, or a low emissivity coating has been removed from the edge areas. For these reasons, among others, the uneven heating up of the surface area of the glass sheet causes problems with quality, such as anisotropy and an increase in the unevenness of a breakage pattern. To solve these problems, the edge areas of a glass sheet require a different kind of heating compared to the remaining areas of the glass sheet. The prior art solutions to solve the problems are not adequate.

SUMMARY

To solve the prior art problems, the present disclosure relates to a tempering furnace for a glass sheet, which has a conveyor for the glass sheet, first convection blow means over the conveyor to heat the glass sheet by hot air jets blown on its top and/or bottom surface, whereby the first convection blow means include a blower pressurising air sucked from the tempering furnace, air channels to lead air from the blower to blow enclosures which have, at their bottom surfaces, first blow openings from which air is discharged as jets towards the top and/or bottom surfaces, electric elements inside the blowing channels heating air, and second convection blow means with the aid of which pressurised air from outside the tempering furnace may be led to second blow nozzles from which air is discharged as jets towards the top and/or bottom surface of the glass sheet, and the electric elements form a matrix-like separately-adjustable electric element field whereby the heating effect of the air jets on the glass sheet is arranged to be adjustable by adjusting the feeding of electric current to the electric elements, and the blow nozzles of the second convection blow means of the tempering furnace form blow zones, separately-adjustable in a matrix-like manner, the heating effect on the glass sheet of the jets discharged from the second blow nozzles inside the blow zones being arranged to be adjustable by adjusting the blowing pressure of feed pipes.

The tempering furnace according to the disclosure has on at least one side of a glass load, primarily on the top side, dense, circulated-air convection which is adjustable in a matrix-like manner to carry out even heating of the glass sheets, and dense pressurised air convection which is adjustable in a matrix-like manner to improve focusing capability of heating. Such a combination adds to the focusing capability of the heating by the furnace as there are two separate convection systems available for the lateral profiling of heating the glass sheet, of which one allows convection to be focused inside the glass sheet also in the direction of movement of the glass sheet. Such a convection capability of the furnace makes it possible to heat the glass sheets ever more evenly and controllably, which improves the quality of the finished tempered glass. In addition, the heating time becomes shorter.

In the tempering furnace according to the disclosure, circulated air convection and radiation heating take care of the primary heating of a glass sheet, with the aim of adjusting the heating rate of the top and bottom surfaces adequately equal so that the glass sheet remains straight in the furnace. In such a case, the rotating speed of the bladed wheel in circulated air convection, for example, is increased, if the heating rate of the bottom surface is faster than the top surface, which is indicated by the glass sheet bending convex in relation to the furnace rollers. Such an adjustment affects evenly in the entire furnace and at the earliest affects the straight keeping of the subsequent load of glass. In addition, the adequately dense matrix-like adjustability of circulated air convection helps the aforementioned primary heating to succeed when heat is automatically transferred adjustment area specifically according to the local load, that is, the heat transferred to the glass. This also prevents an area of the furnace without glass from heating above an adjustment value, whereby the furnace receives the subsequent glass sheet or load of glass well-balanced. The profiling in the lateral and longitudinal direction of the furnace is performed by pressurised air convection, and the adjustment values of the adjustment sensors in circulated air convection may be the same in the entire adjustment matrix. Such a combination of adjustment allows a more controlled heating of successive loads of glass and a decrease in random fluctuation in heating, which results in the average quality of the tempered glass sheet improving.

Circulated air convection may also be used for lateral profiling of heating, which can be done by setting lower adjustment values for the electric elements (thermoelements) over the side edges of a glass sheet than for the electric elements between them. The profiling can, however, be accomplished in the manner described in the above only when the glass sheets of the load of glass are approximately of the same size and placed in successive approximately straight rows, i.e. their side edges are approximately on the same line in the direction of movement of the glass. In addition, the profiling need in the subsequent load of glass may be different or in another place of the furnace, and the furnace has no time without an additional delay period to be balanced temperature-wise before it moves into the furnace. In such a case, the profiling of the previous load of glass also partly affects the new load of glass, but the area of influence is wrong.

By momentarily changing the adjustment values of the electric element field that heats the blowing air of circulated air convection it is not possible to prevent the front and rear ends of a glass sheet from overheating in relation to the remaining length of the glass, because the adjustment of the electric current of the electric element only shows in the heating with a delay which, in relation to the movement rate of the glass in the furnace, is much too long to focus additional convective heating on the aforementioned remaining glass length. Therefore, the pressurised air convection according to the disclosure is always used when a successful heating of a glass sheet requires focusing of heating in the longitudinal direction of the glass sheet, or fast momentary addition of convection during heating to prevent the glass sheet from bending, for example.

The aforementioned goal of the disclosure is achieved according to the present disclosure by combining circulated air convection adjustable in a matrix-like manner to carry out even heating of glass sheets with pressurized air convection adjustable in a matrix-like manner to improve the focusing of heating.

In the patent application, a convection blowing system adjustable in a matrix-like manner refers to such convection blow means that are divided into separately adjustable subareas both in the longitudinal and width direction of a tempering furnace. The subareas of the separately adjustable matrices are advantageously short and narrow, which improves the matrix-like adjustability and results in the advantages the disclosure aims at. The essential fact is that the heating up of the glass moving in the furnace may be managed both in the longitudinal and width directions of the glass, that is, convection may be aimed in a matrix-like manner within the surface area of the glass. The smallness of the adjustment area is mostly limited by the rising costs in accordance with the quantity of the adjustment areas. Advantageously, focusing of some sort is achieved on a glass sheet 0.5 m wide and long, and convection focusing that is at least satisfactory is achieved on a glass sheet 1 m wide and long. The length of the glass sheets in the direction of movement of the glass heated up by the device in the furnace is usually 0.25 to 6 m and width 0.1 to 3.3 m. The width of the heating area of the furnace is usually 1.2 to 3.5 m, and the length 4 to 10 m. One load of glass may have as many as tens of glass sheets, depending on their size.

Preferred embodiments are disclosed herein.

BRIEF DESCRIPTION OF THE DRAWINGS

In the following, the disclosure is described in closer detail with reference to the accompanying drawings, in which.

DETAILED DESCRIPTION

Figure 1:
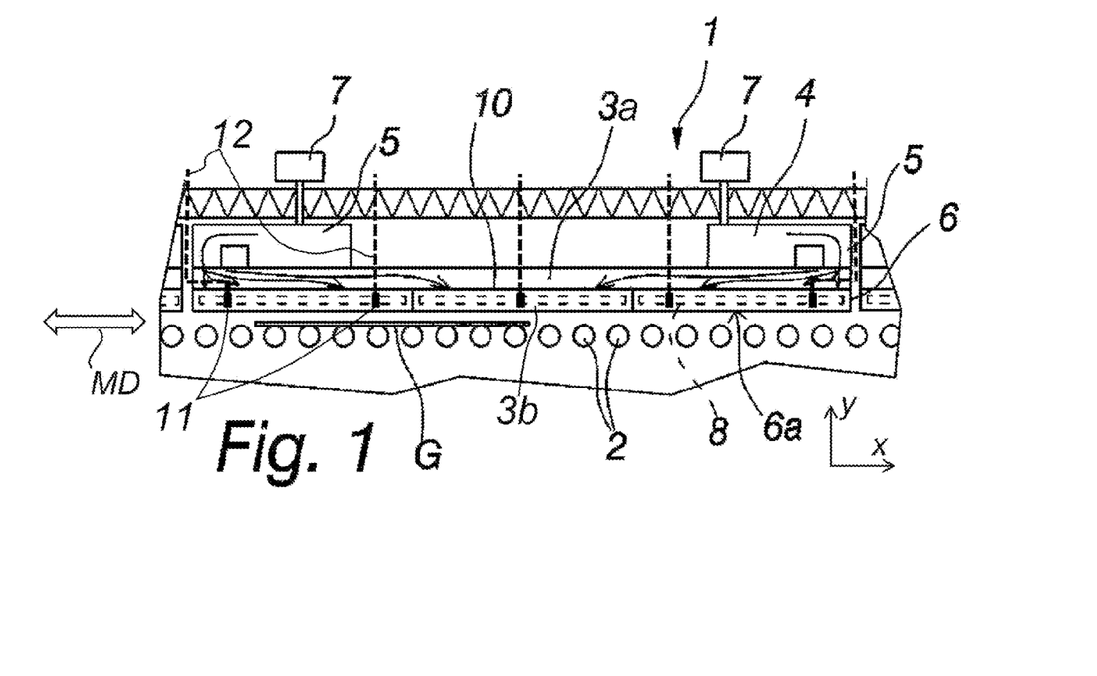
FIG. 1 is a side view (to direction z) of a preferred embodiment of the device according to the disclosure.
Figure 2:
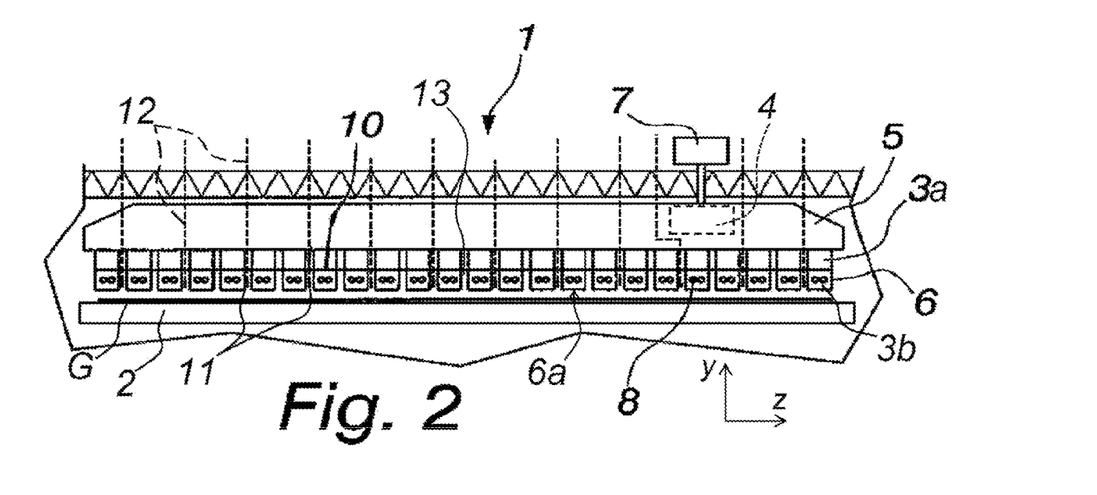
FIG. 2 is an end view (to direction x) of the device according to FIG. 1.

FIGS. 1 and 2 show the device for heating glass sheets for tempering according to the disclosure. The device includes a tempering furnace which is denoted with the reference number 1. The tempering furnace 1 has a longitudinal and width direction, and a glass sheet moves in there from a loading table. Within the tempering furnace 1, a conveyor 2 has been arranged, which is a roller track, for example, on top of which glass sheets G may be carried in the longitudinal direction of the furnace. In the so-called continuous tempering furnace, a glass sheet moves through the furnace once, only, and in the so-called oscillating tempering furnace, a glass sheet moves back and forth until the heating time is up. In FIGS. 1 to 5, the arrow MD indicates the movement direction of the glass inside an oscillating furnace. The rate of movement of the glass sheet in a tempering furnace is typically 50 to 200 mm/s. In an oscillating furnace, the rate at the moment when the direction changes is 0, from which the rate accelerates to the aforementioned reading. From the tempering furnace, the glass sheet is transferred to a temperer in which it is intensely cooled down with air jets. The transferring rate is typically 200 to 600 mm/s.

Above the conveyor, advantageously at a short distance of typically 5 to 20 cm, advantageously 7 to 13 cm, there are arranged blow enclosures 6 on the side below which, on a so-called nozzle deck 6a, blow openings 9 have been formed to blow heated convection air towards the conveyor and, in particular, towards the glass sheet G being conveyed on the conveyor. The blow openings 9 are typically holes machined in a plate and having a diameter of 5 to 15 mm. To circulate the convection air blown on the glass sheet G, the tempering furnace 1 has means 3a to 8 arranged in it.

The blow enclosure 6 consists of a dividing part 3a in which air flown from division channels 5 in the width direction of the furnace, and blow part 3b which has electric elements 8 in it. In the blow enclosure, the dividing part 3a connected to the blow part 3b by a perforated plate 10. The purpose of the perforated plate 10 is to even out blowing pressure differences between the various blow openings 9 of the blow enclosure. The blow openings 9 are on the nozzle deck 6a, on the surface of the blow enclosure 6, which faces the glass. The division channels 5 are equipped with recirculation blowers 4 which are inside the furnace 1. The drive motor 7 of the recirculation blower 4 is arranged on the outside of the furnace 1. The rotation speed of the drive motor 7 may be adjusted by a frequency converter. The furnace has one more of the units shown in FIG. 1 successively.

Inside the blow enclosures 6, electric elements 8 have been arranged, with the air fed in the blow enclosure 6 heating up when it flows between them, and thus flows hotter into the blow openings 9 from which the air is discharged as jets towards the glass sheet G.

Each of the separately adjustable electric elements 8 have their own adjustment sensor which is advantageously attached to the bottom surface of the blow enclosure, in other words, the surface facing the glass. The sensor may also be placed slightly, advantageously approximately 1 to 30 mm, closer to glass sheet than the aforementioned bottom surface, or in a centralized manner in a blow opening i.e. air jet of a blow enclosure portion covered by one electric element. The adjustment sensor is advantageously a thermoelement. A dedicated adjustment value temperature may be set for each thermoelement, and a dedicated so-called firing time for the electric element. The firing time determines the longest possible on time for the electric element, so the time period of feeding electric current, during one adjustment period. An advantageous duration for the adjustment period of the electric elements is 2 to 8 s. A firing time shorter than the adjustment period may thus be used to limit the power averaged in relation to the duration of the adjustment period of the electric element. Both the thermoelement set value and the firing time may be used to adjust different convection and radiation heating for adjacent and successive blow zones in the blow field.

In addition, inside the tempering furnace, blow nozzles 11 have been arranged in a matrix-like manner in the gaps 13 between the blow enclosures. Pressurised air is led into the blow nozzles through feed pipes 12.

In the drawings, the x direction is the direction of travel of the glass sheet, for which the z direction is the transverse horizontal direction. The y direction is the vertical direction.

Figure 3:
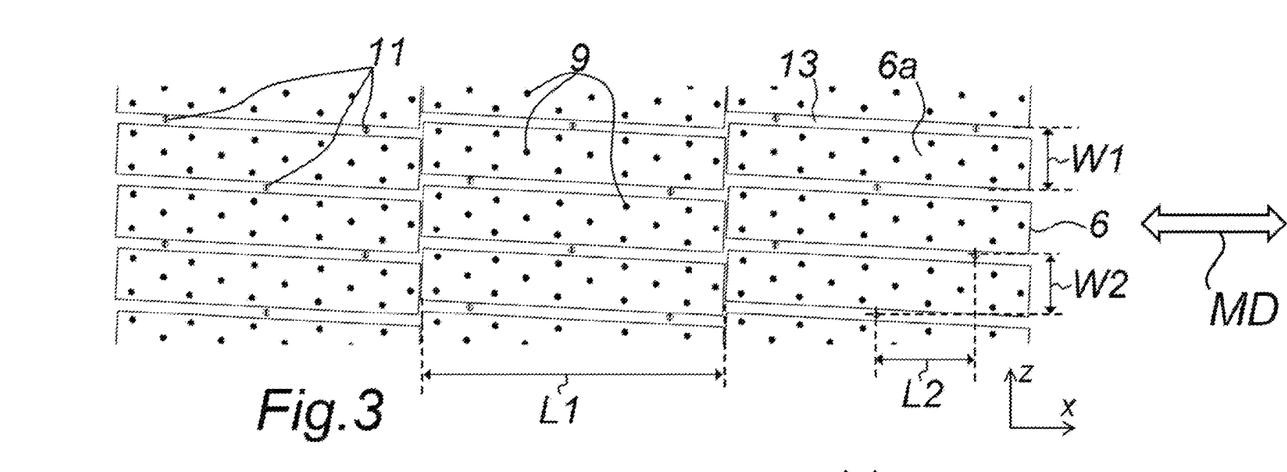
FIG. 3 shows blow enclosures and blow nozzles according to the embodiment shown in FIG. 1 from below (as seen in direction y)

FIG. 3 shows an advantageous embodiment of the device according to the disclosure. FIG. 3 shows the blow enclosures 6 as seen from below. Here, each blow enclosure 6 is at the blow part 3b divided into successive enclosure parts of which 6a is nozzle deck of one enclosure part, and of these each successive enclosure is installed at an acute angle α in relation to the travel direction x of the glass, whereby a staggered structure is formed even though the enclosure parts are in line in the travel direction of the glass in relation to each other. The aforementioned angle α is advantageously 2 to 10 degrees, more advantageously approximately 3 to 5 degrees. The enclosure parts may also be in straight rows without the staggering, whereby the direction of the rows and blow enclosure 6 is at the aforementioned angle in relation to the direction of travel x of the glass. In such a case, one nozzle deck 6a may be of the length of the entire blow enclosure 6, that is, one blow enclosure has one enclosure part, only.

In the gaps 13 between the blow enclosures, blow nozzles 11 are arranged in a matrix-like pattern. The blow nozzles 11 may be holes machined in the feed pipes 12, or separate nozzles fixed to the feed pipes. The flow cross sectional area of one blow nozzle is advantageously 0.5 to 4 mm². The blow nozzles 11 are in rows of approximately the length of the furnace and lines of the width of the furnace, the lines being in the longitudinal direction of the furnace, so the x direction, at a distance L2 from each other. The distance L2 is typically 50 to 500 mm and advantageously 100 to 300 mm. In FIG. 3, the blow nozzles are so arranged that in the same line in the width direction of the furnace there is a blow nozzle 11 in every other gap 13, only, and the distance between blow nozzles in the same row in the longitudinal direction of the furnace, so in the same gap, is L2*2. In FIG. 3, the blow nozzle rows in the longitudinal direction of the furnace are in the width direction of the furnace, so the z direction, at a distance W2 from each other on both sides of the same blow enclosure. In the embodiment of the figure, the distance W2 varies somewhat depending on which blow nozzles of adjacent gaps 13 it is determined for, because the row of blow nozzles are not straight in the longitudinal direction of the furnace as a result of the staggering of the enclosure parts. The distance W2 is typically 20 to 250 mm and advantageously 40 to 160 mm. The distance W2 is advantageously longer than the width of the nozzle deck 6a and shorter than the nozzle deck distribution in the z direction. The dimensions referred to in the above for the lines and rows of blow nozzles also apply to the positioning of the separately adjustable blow nozzles in the furnace.

In FIG. 3, the blow nozzles 6 are in the longitudinal direction of the furnace. In such a case, the width of the separately adjustable blow zone of circulated air convection in the width direction W1 of the furnace is advantageously, and in FIG. 3, the same as the blow enclosure distribution in the width direction of the furnace, so the width of the blow enclosure and gap in the width direction of the furnace. Typically, W1 is 30 to 300 mm and advantageously 60 to 160 mm. The length L1 of the separately adjustable blow zone of circulated air convection in the longitudinal direction of the furnace is typically 200 to 1500 mm and advantageously 300 to 1000 mm. Advantageously and in FIG. 3 the length L1 is the same as the length of the enclosure part in the longitudinal direction of the furnace.

Figure 4:
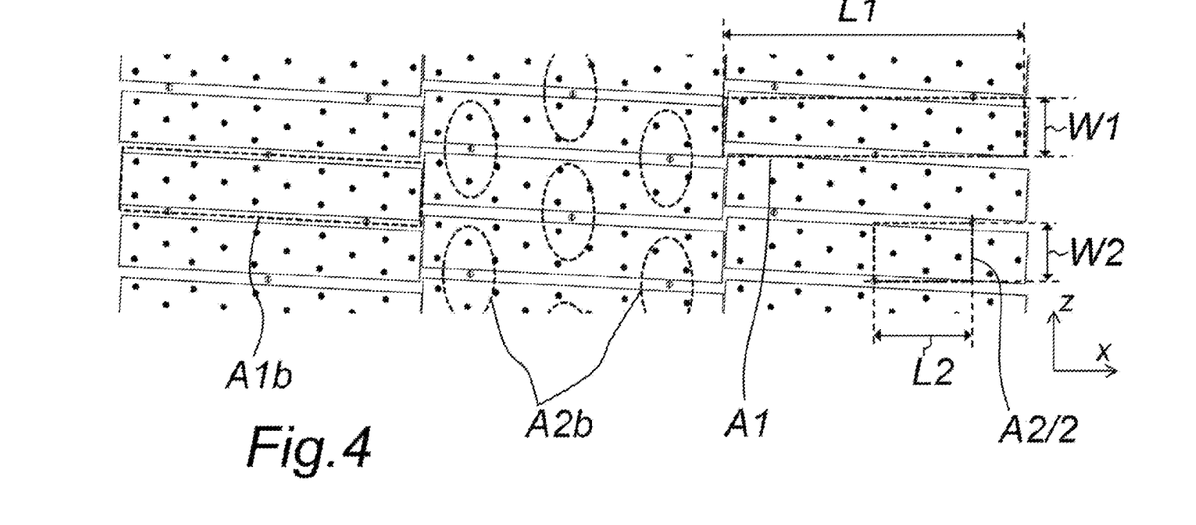
FIG. 4 shows the size of separately adjustable blow zones.

FIG. 4 shows in closer detail the size of separately adjustable areas of the convection blow means of FIGS. 1 to 3. The surface area of one separately adjustable area of influence on a glass surface is A1b which in the z direction is slightly wider than the width of the nozzle deck 6a. This is the case because the blow jets affect a wider area on the glass surface than the surface area of the nozzle deck, depending on their blow distance to the glass. According to the preferred embodiment, the surface area of one separately adjustable area of influence of the second convection blow means on the surface A2b of the glass is oval-shaped in FIG. 4. The pattern, as to its opening, corresponds to the blow nozzle 11 whose flow opening in the z direction is slightly wider than in the x direction. The figure does not show that the effect on the glass surface is biggest at the hitting point of the blow nozzle, and rapidly decreases when moving further away from it. In fact, it is impossible to determine unambiguously the exact size A2b of the area of influence of the blow nozzle 11 because it depends on the blow distance, that is, the distance in the y direction between the glass sheet and opening of the blow nozzle, and additionally on the definition of which kind of convection level is considered effective. Therefore, the size of cells C1i and C2i of the adjustment matrices C1 and C2, that is, the surface area of one separately adjustable area of influence of the convection blow means, is determined with cover areas A1 and A2. The cover area A1 is the surface area of the furnace heating area, or more specifically, the blow zone covered in the furnace A1tot by the first convection blow means, divided by the number N1 of separately adjustable electric elements in the blow enclosures within the area A1tot, and cover area A2 is the blow zone in the oven covered by the second convection blow means A2tot, divided by the number N2 of separately adjustable blow nozzles within the area A2tot (i.e., A1=A1tot/N1 and A2=A2tot/N2). In FIG. 4, the surface area A1b is approximately equal to the surface area A1, because the gaps 13 between the blow enclosures are narrow. As the separately adjustable areas consist of one enclosure part of one nozzle enclosure, with its electric elements, and one blow nozzle 11, the cover area A1 with the FIG. 4 markings is W1*A1, and the cover area A2 is 2(W2*L2). Advantageously, the cover area A1 is 200 to 1500 cm2 and cover area A2 is 50 to 600 cm2. One furnace N1 has advantageously at least 80 pieces and N2 at least 160 pieces.

According to a preferred embodiment, there are at least 6 pieces of separately adjustable blow zones of the first convection blow means in the width direction of the tempering furnace, and at least 10 pieces of separately adjustable blow zones of the second convection blow means in the width direction of the tempering furnace.

According to a second preferred embodiment, there are at least 6 pieces of separately adjustable blow zones of the first convection blow means in the longitudinal direction of the tempering furnace, and at least 20 pieces of separately adjustable blow zones of the second convection blow means in the longitudinal direction of the tempering furnace.

As described in the preferred embodiment of FIGS. 1 to 4, the second convection blow means comprise feed pipes 12 passing through the ceiling of the furnace, which are adapted to run between the gaps of the elongated blow enclosures substantially in the longitudinal direction of the furnace, so in the direction of movement of the glass sheets and blowing on the top surface of the glass, and which end at second blow nozzles 11.

Figure 5:
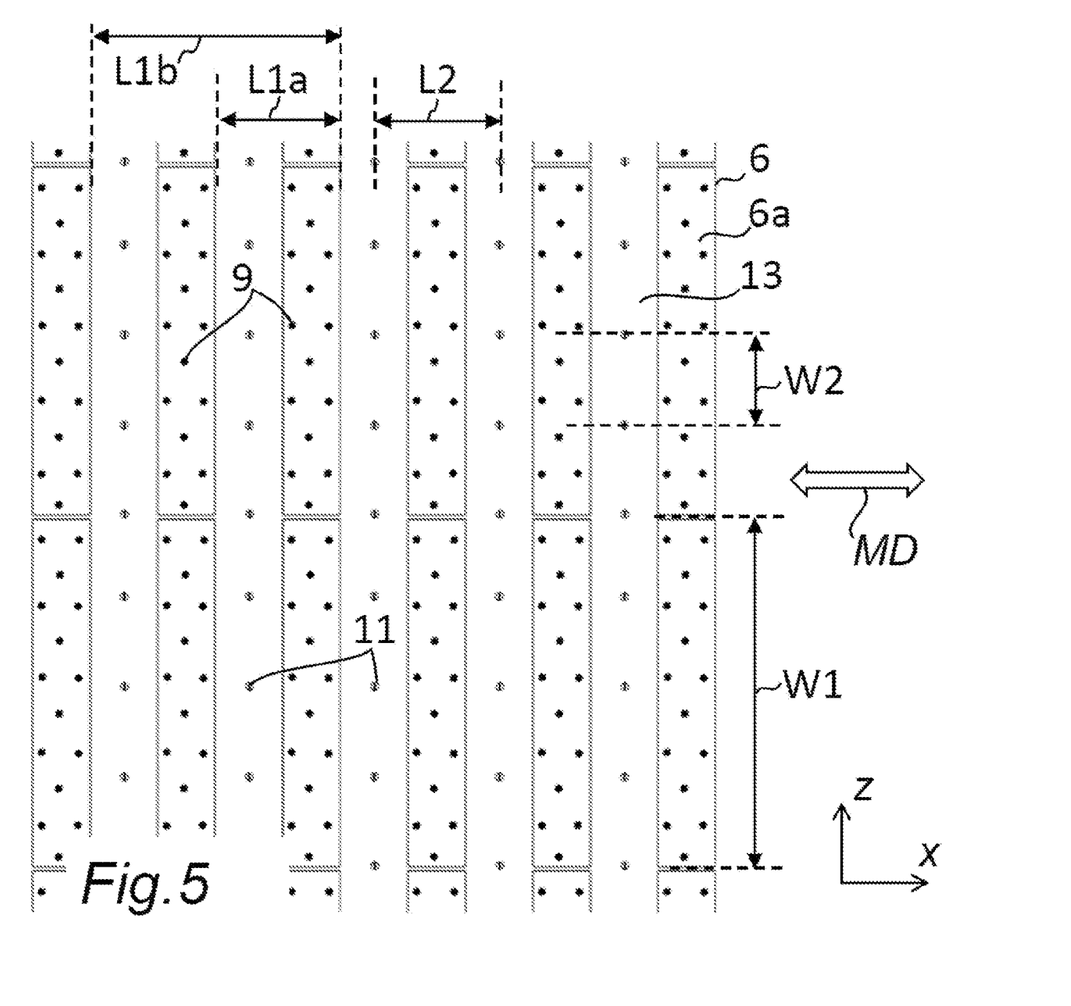
FIG. 5 shows a device according to an alternative embodiment of the disclosure.

According to a second preferred embodiment, the second convection blow means comprise feed pipes 12 passing through the ceiling or side walls of the furnace, which are adapted to run between the gaps of the substantially lateral blow enclosures in the width direction of the furnace, so transverse to the direction of movement of the glass sheets and blowing on the top surface of the glass, and which end at second blow nozzles 11. Such an embodiment is shown in FIG. 5. The figure does not show the feed pipes 12, which may be adapted to run as in FIGS. 1 and 2. Running them through the side walls of the furnace is also a preferred solution, because the gaps 13 between the blow enclosures are in the z direction. In the case of blow enclosures in the width direction of the furnace, the gaps 13 between the blow enclosures may be set wider (x direction) than the longitudinal blow enclosures of FIG. 3, and they may be of equal width and straight in the z direction over the entire width of the furnace (z direction). This facilitates the positioning of feed pipes into the furnace so that they do not prevent the initial installation of the blow enclosure parts and their dismantling/installation in connection with servicing, such as replacement of the electric elements 8.

In FIG. 5, the same markings for the dimensions apply as for FIG. 3. The aforementioned preferred and typical values for the separately adjustable length L2 and width W2 also apply now, but the change of direction of the blow enclosures from longitudinal in relation to the furnace to being lateral changes the dimensional values of the first convection blow means. Now the width W1 of the separately adjustable blow zone of circulated air convection is 50 to 500 mm and advantageously 150 to 400 mm, the length L1 of the separately adjustable blow zone is typically 50 to 1200 mm and advantageously 100 to 800 mm. In FIG. 5, the width W1 is the same as the length of the enclosure part in the width direction of the furnace. On the other hand, in this embodiment the division into enclosure parts does not provide additional advantages.

In FIG. 5, the dimensions L1a and L1b correspond to the lengths L1 of the blow zone separately adjustable in the longitudinal direction of the furnace by an electric element. As concerns the dimension L1a, the separately adjustable area includes one blow enclosure, only, and as concerns the dimension L1b, two. Thus, the separately adjustable blow zone, or coverage area A1, may include electrically interconnected electric elements in blow enclosures or blow enclosure parts that are successive in the longitudinal direction of movement of the glass. On the other hand, the advantageous values referred to for the separately adjustable coverage areas (A1, A2) and number (N1, N2) of the blow enclosures in the longitudinal direction of the furnace also apply in the embodiment of blow enclosures in the width direction of the furnace, as will the next solution. According to a preferred embodiment, the length L1 of the separately adjustable blow zone of the first convection blow means is at most 1200 mm in the direction of travel of the glass, and it includes at least one electric element within the blow enclosure.

Figure 6:
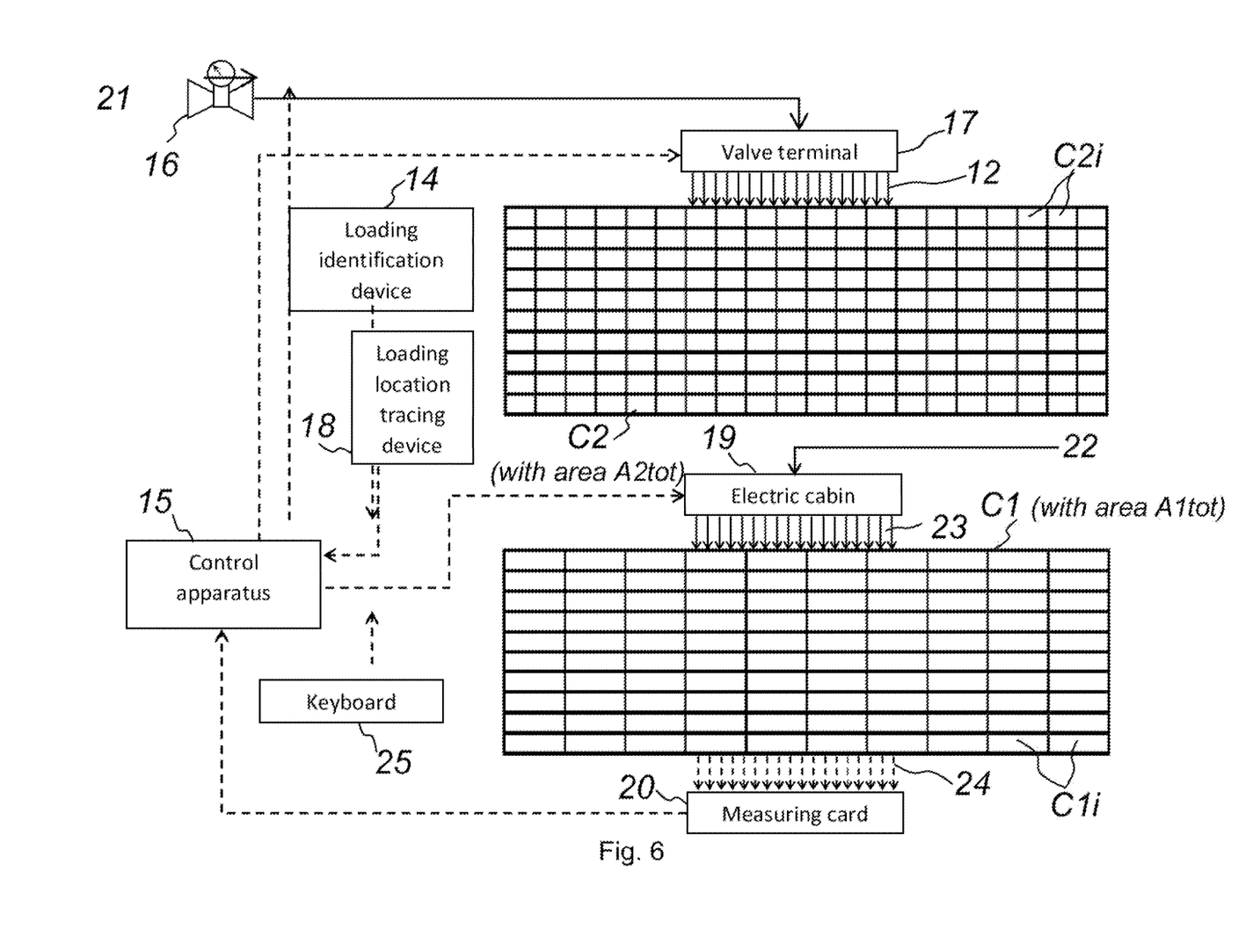
FIG. 6 is a schematic view of the device according to the disclosure.

FIG. 6 is a schematic view of the device according to the disclosure. The tempering furnace comprises a detector 14 which reads information concerning the loading of glass sheets, which may be, for example, a camera shooting the load of glass on a loading table, or a dense row of capacitive or optical sensors transversely to the direction of movement of the glass, over which the load of glass moves as it is being transferred to the tempering furnace. The detector 14 sends its information, that is, information needed for solving the shape of the load of glass, to a control device 15 which is a computer, for example. The tempering furnace further comprises a device 18 producing information needed to determine the location of the glass sheets within the glass furnace, which is, for example, a servo motor of the conveyor of the tempering furnace, or a pulse sensor connected to the actuators of the conveyor.

The second convection blowing devices are controlled as in the following, for example. An operator uses a keyboard 25 to give a control device 15 the blowing pressure and glass sheet specific blow zone where the blowing from blow nozzles 11 is to be aimed. The control device 15 may itself also select this information on the basis of the glass sheet size, for example. The adjustment setting defines 3 bar, for example, as the blowing pressure, and the entire surface area of the glass sheet as the blow zone, excluding 20 cm from the front and rear ends, and 15 cm from both side edges. An adjustment valve 16 adjusts itself to the adjustment value of the blowing pressure, that is, chokes the pressure of the pressurised air source 21 to the 3-bar feed pressure of a valve terminal 17. The pressurised air source, so the device feeding pressurised air in from outside the furnace, is advantageously a pressurised air compressor with an advantageous delivery overpressure of 6 to 12 bar. The blowing pressure into the furnace, that is, pressure difference over the blow nozzle, is advantageously 0.5 to 4 bar. The load of glass moves on to the furnace. The valve terminal 17 has a dedicated valve for each separately adjustable unit, so cell C2$i$, of the adjustment matrix C2 of the second convection blow devices. The valve is advantageously a shutter valve, that is, a valve having open and closed positions, only. The control device 15 controls the valves of the valve terminal by using information obtained from the detector 14 and device 18 so that the adjustment setting of the blow zone is realised as accurately as possible. The accuracy is limited by the width and length of the cells C2$i$, and by how the glass sheets are located in the furnace in relation to the cells. The accuracy may be improved by shortening the aforementioned dimensions of the cells. The profiling of the convection in the width direction of the glass is also improved by taking into account the location of the profiling lines in positioning the side edges of the glass when the glass sheets are being placed on the loading table. The control device may neglect the profiling and blow onto the entire glass, if an accurate enough calculated profiling cannot be obtained for the glass sheet. The blowing of pressurised air from blow nozzles at glassless areas is cut off. When the valve is open, pressurised air flows along the feed pipe 12 to the blow nozzle 11 from which it is discharged towards the glass sheet. Each cell C2$i$ has its own feed pipe 12. When the valves of the valve terminal are of the type of the adjustment valve 16, a different blowing pressure may be set on different blow zones. The air discharge from a blow nozzle is tied to the blowing pressure. Both shutter and adjustment valves are thus used to adjust the mass flow of air discharged from the blow nozzles. The local heat flow q transferring from air to the glass sheet is the product of the convective heat transfer coefficient and the temperature difference between the air (Tair) and the glass sheet surface (Tglass), that is, $q=h(T_{air}-T_{glass})$. As the mass flow increases, the rate of the jet hitting the glass sheet increases, which adds to the heat transfer coefficient h. Thus, heat transfer to the glass sheet is increased, so the heating effect of the air jets on the glass sheet is enhanced. Therefore, the heating effect on the glass sheet of the air jets discharged from the blow nozzles of the second convection blow devices is arranged adjustable by a valve by adjusting the feeding of the air stream to the blow nozzles.

The first convection blowing devices are controlled as in the following, for example. An operator chooses a blowing pressure or the magnitude of an adjustment value affecting it, which may also be set to change in relation to the heating time. The operator uses a keyboard 25 to enter the set temperatures and/or firing times for all the separately adjustable electric elements of the adjustment matrix C1, that is, cells C1$i$. The operator may, for example, lower the cells at the edges of the glass sheet to the adjustment values 680° C. and keep the rest of the cells at adjustment values 700° C., and shorten the firing times of the electric elements at the beginning and end part of the furnace by 50%. The load of glass moves on to the furnace. Each cell C1$i$ has its own switch in an electric cabinet 19, and a feed cable 23 or electric current. The switch is used to cut the electric current that an electric network 22 supplies to the electric element. The control device 15 controls the switches in the electric cabinet on the basis of the temperatures measured by the temperature sensors, adjustment values of the temperatures, and firing times. There is a plurality of temperature sensor cables 24 connected to one measuring card 20. The heating effect of the air jets of the first convection blow devices on the glass sheet increases, because the electric element increases the temperature of the air jet, whereby the term (Tair−Tglass) in the aforementioned equation increases. Increasing the set temperature in cell C1$i$ adds to the heat stream from the cell C1$i$ to the glass sheet, so the consumption of electric current of the electric element of the cell also increases. Thus, both the set temperature and firing time affect the supply of electric current to the electric element. Therefore, the heating effect on the glass sheet of the air jets discharged from the blow nozzles of the first convection blow devices is arranged adjustable by adjusting the feeding of electric current to the electric element.

The shape of the blow nozzles 11 is advantageously such that the jet discharged from them is wider in the width direction of the furnace than in the direction of movement of the glass inside the furnace. In such a case, the convection created by the jet on the surface of the glass evens out in the width direction of the glass.

One feed pipe may feed air to a plurality of blow nozzles when it is branched at the end to different blow nozzles, or when one blow nozzle part has a plurality of blow nozzles. However, the blow openings of the separately adjustable blow zone of the second convection blow means advantageously consist of 2 blow nozzles, at most, so as to make the blow zones suitably sized in relation to the force of a single jet. The force of a single jet released from the blow nozzle of the second convection blow means must be sufficient so that its heating effect clearly adds to the heating effect of the first convection blow means. To guarantee the above, the blowing distance to the glass has to be short enough. It is therefore advantageous to set the feed pipes of the blow nozzles to run between the gaps of the blow enclosures so that the blow nozzles of the second convection blow means are in the gaps between the blow enclosures, that is, further from the glass sheet than the surface of the nozzle enclosures, which is the closest facing the glass, and closer to the glass sheet than the furthest surface of the nozzle enclosures from the glass sheet, or closer to the glass sheet than the blow openings of the first convection blow devices. More advantageously still, the blow nozzles are so deep between the blow enclosures that their vertical direction to the glass sheet is shorter than that of the perforated plate. The blow nozzles are advantageously at the vertical distance of 150 mm, at most, from the surface of the glass.

The disclosure described in the above is not restricted to the disclosed embodiment, but it may be varied in a number of ways within the scope defined by the claims. For example, the blow enclosures may be longitudinal, transverse, or at any skew angle in relation to these directions. The convection blow device pair according to the disclosure may blow only onto the top or bottom surface of the glass, or both sides may have their own device pair. The gas circulated in or blown into the furnace may be other than air, too. It may also be a mixture of air and another gas. The channels feeding air to the blow enclosures may differ from the described and it may have a different number of blowers.

The invention claimed is:

1. A tempering furnace for a glass sheet, comprising:
a conveyor configured to convey the glass sheet; and
first convection blow means configured to heat the glass sheet by hot air jets blown on at least one surface of the glass sheet,
wherein the first convection blow means include:
a blower configured to pressurize air sucked from the tempering furnace;
air channels configured to lead air from the blower to blow enclosures, the blow enclosures having, at surfaces of the blow enclosures facing the glass sheet, blow openings from which air is discharged as jets towards the glass sheet; and
electric elements inside the blow enclosures configured for heating air,
wherein the tempering furnace further comprises:
second convection blow means configured to aid in leading pressurized air from outside the tempering furnace to blow nozzles from which air is discharged as jets towards the at least one surface of the glass sheet,
wherein the electric elements and the blow enclosures of the first convection blow means form a plurality of first separately-adjustable blow zones in longitudinal and width directions of the tempering furnace, in which a heating effect of the hot air jets on the glass sheet is adjustable by adjusting a feeding of electric current to the electric elements,
wherein the blow nozzles of the second convection blow means of the tempering furnace form a plurality of second separately-adjustable blow zones in the longitudinal and width directions of the tempering furnace, in which a heating effect on the glass sheet of the jets discharged from the blow nozzles is adjustable by adjusting a feeding of airflow to the blow nozzles, and
wherein feed pipes of the blow nozzles of the second convection blow means are arranged to run, in a direction toward the glass sheet, in gaps outside of and between the blow enclosures such that the blow nozzles of the second convention blow means are closer to the glass sheet than a top surface of the blow enclosures of the first convection blow means.

2. The tempering furnace as claimed in claim 1, wherein the first separately-adjustable blow zones of the first convection blow means are arranged with a separation of less than 1500 mm in a direction of movement of the glass sheet, and with a separation of at most 300 mm in a direction transverse to the direction of movement of the glass sheet, and the second separately-adjustable blow zones of the second convection blow means are arranged with a separation of at most 500 mm in the direction of movement of the glass sheet, and with a separation of at most 250 mm in the direction transverse to the direction of movement of the glass sheet.

3. The tempering furnace as claimed in claim 1, wherein the first separately-adjustable blow zones of the first convection blow means are arranged with a separation of less than 1000 mm in a direction of movement of the glass sheet, and with a separation of at most 160 mm in a direction transverse to the direction of movement of the glass sheet, and the second separately-adjustable blow zones of the second convection blow means are arranged with a separation of at most 300 mm in the direction of movement of the glass sheet, and with a separation of at most 160 mm in the direction transverse to the direction of movement of the glass sheet.

4. The tempering furnace as claimed in claim 1, the first separately-adjustable blow zones of the first convection blow means comprise at least 6 pieces in the width direction of the tempering furnace, and the second separately-adjustable blow zones of the second convection blow means comprise at least 10 pieces in the width direction of the tempering furnace.

5. The tempering furnace as claimed in claim 1, the first separately-adjustable blow zones of the first convection blow means comprise at least 6 pieces in longitudinal direction of the tempering furnace, and the second separately-adjustable blow zones of the second convection blow means comprise at least 20 pieces in the longitudinal direction of the tempering furnace.

6. The tempering furnace as claimed in claim 1, the first separately-adjustable blow zones of the first convection blow means comprise at least 80 pieces in the tempering furnace, and the second separately-adjustable blow zones of the second convection blow means comprise at least 160 pieces in the tempering furnace.

7. The tempering furnace as claimed in claim 1, wherein one of the first separately-adjustable blow zones of the first convection blow means covers a heating surface area of at most 1500 cm2 of the tempering furnace, and one of the second separately-adjustable blow zones of the second convection blow means covers a heating surface area of at most 600 cm2 of the tempering furnace.

8. The tempering furnace as claimed in claim 1, wherein blow parts of the blow enclosures are installed at an acute angle in
   relation to a direction of travel of the glass sheet, the angle being from 2 to 10 degrees, and the tempering furnace is configured to feed air to the blow nozzles through the ceiling of the tempering furnace and by the feed pipes running between the blow enclosures.

9. The tempering furnace as claimed in claim 1, wherein the blow enclosures are substantially parallel to the width direction of the furnace, and the feed pipes of the blow nozzles of the second convection blow means run through the ceiling or side wall of the furnace, and are arranged to run between the gaps of the blow enclosures and which end at the blow nozzles.

10. The tempering furnace as claimed in claim 1, wherein a shape of the blow nozzles is such that the jet discharged from the blow nozzles is wider in the width direction of the tempering furnace than in a direction of travel of the glass sheet within the furnace.

11. The tempering furnace as claimed in claim 1,
    wherein a totality of the blow openings of the second separately-adjustable blow zone of the second convection blow means consists of at most a single nozzle with only a single blow opening that is wider in the width direction of the tempering furnace than in a direction of travel of the glass sheet within the furnace.

12. The tempering furnace as claimed in claim 1, further comprising:
    a detector producing information for determining shape dimensions of a load of glass;
    a device producing information for determining a momentary location of the glass sheet inside the tempering furnace; and
    control devices to control valves of the second convection blow means on the basis of the shape dimensions of the load of glass and the location of the glass sheet.

13. The tempering furnace as claimed in claim 1, wherein the heating effect of the first convection means is further adjustable by adjusting a rotation rate of a bladed wheel of the blower.

* * * * *